(12) United States Patent
Green

(10) Patent No.: US 7,493,012 B2
(45) Date of Patent: Feb. 17, 2009

(54) COMPATIBILITY TESTING

(75) Inventor: Stuart A. Green, Sheffield (GB)

(73) Assignee: Zootech Limited (GB)

( * ) Notice: Subject to any disclaimer, the term of this patent is extended or adjusted under 35 U.S.C. 154(b) by 862 days.

(21) Appl. No.: 10/828,541

(22) Filed: Apr. 20, 2004

(65) Prior Publication Data

US 2005/0232577 A1  Oct. 20, 2005

(51) Int. Cl.
*H04N 5/91* (2006.01)
(52) U.S. Cl. .................................................. 386/46
(58) Field of Classification Search ................ 386/46, 386/52, 53, 92–98
See application file for complete search history.

(56) References Cited

U.S. PATENT DOCUMENTS

| 4,562,494 | A |   | 12/1985 | Bond |
|---|---|---|---|---|
| 4,608,617 | A |   | 8/1986 | Oishi et al. |
| 4,858,027 | A | * | 8/1989 | Sashou et al. ................. 386/4 |
| 5,420,975 | A | * | 5/1995 | Blades et al. ............... 715/811 |
| 5,903,701 | A | * | 5/1999 | Lydecker et al. ............. 386/46 |

\* cited by examiner

*Primary Examiner*—Thai Tran
*Assistant Examiner*—Mishawn Dunn
(74) *Attorney, Agent, or Firm*—Wilmer Cutler Pickering Hale & Dorr LLP.

(57) ABSTRACT

Embodiments of the present invention relate to a data processing system and method for automatically testing a digital content player to ensure compliance with a video image data specification.

27 Claims, 9 Drawing Sheets

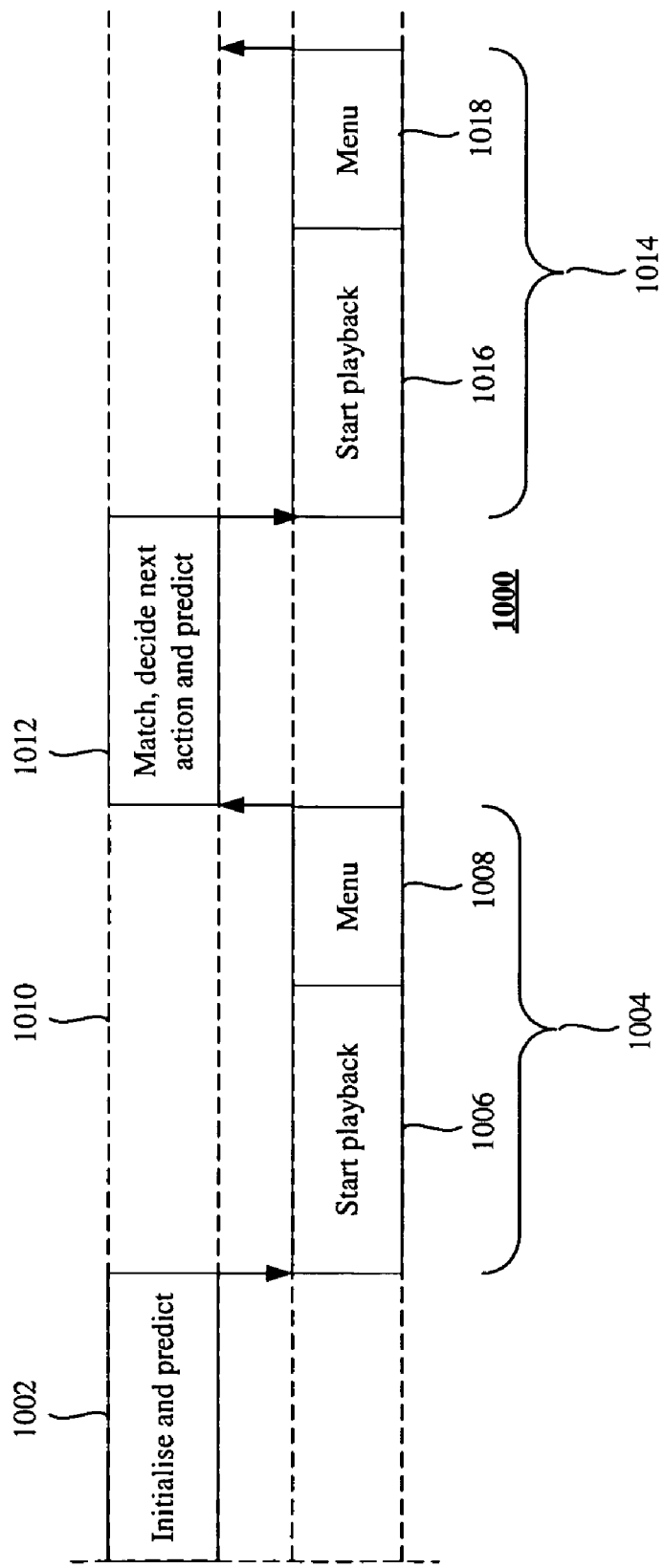

COMPATIBILITY TESTING

FIELD OF THE INVENTION

The present invention relates to a data processing system and method and, more particularly, to automated testing of media or digital content players.

Background to the Invention

There are typically three types of testing that are undertaken to test DVD products. These three types of testing aim to test (1) functionality, (2) quality and (3) compatibility. The functionality testing of a DVD product aims to confirm that the navigation paths through the various menus and, ultimately, to the various digital content, is as intended. This test is typically achieved by a person using the disc and performing a number of tests and checks dictated by, for example, a functionality test plan. The functionality test plan comprises a list of features or actions that a user of a disc under test should be able to perform. The test plan investigates whether or not various tests have been met and whether or not the responses to various actions were as anticipated. The functionality test plan might be used in conjunction with a flowchart that shows the navigation paths through the menus and various audiovisual assets stored on the test disc or digital content under test.

Quality testing is more subjective and aims to ensure that a user's experience when playing the DVD is not undermined or detracted from by the presence of audio-visual problems such as, for example, visible artefacts due to inappropriate encoding of the video or images.

In theory, each DVD player should respond identically to the same DVD. However, there are a number of ambiguities within the DVD specification. Furthermore, aspects of the implementation of the DVD specification are amenable to a number of interpretations. For example, the DVD specification provides for the generation of random numbers without prescribing a specific method of generating them. Clearly, there is some flexibility in implementing random numbers. Still further, there is also the risk that manufacturers introduce errors in their implementation of the DVD specification. A further example of an ambiguity relates to the number buttons on a remote control device. The DVD specification indicates that a remote control device can optionally include numeric buttons. The numeric buttons can be used to activate menu buttons such as, for example, pressing button "1" corresponds to pressing menu button 1. For some devices, pressing a numeric button selects and activates the corresponding menu button, which is equivalent to using the conventional arrow keys and selecting "OK", and for other devices, selecting a numeric button merely selects a corresponding menu button but does not activate it. Clearly, the freedom on the part of DVD player manufacturers to select and activate or merely to select menu buttons in response to actuation of a respective numeric button represents a source ambiguity in implementing the DVD specification. These ambiguities can lead to manufactures or producers of DVD players implementing the same aspect of the DVD specification differently. Any such differences in implementation of the DVD specification introduces the possibility that different DVD players will not react predictably, that is, given the same content, the different DVD players might respond to that content differently. This position creates difficulties for manufacturers, vendors and authors of DVDs or DVD digital content since they wish to ensure that their product will appeal to the broadest market possible. Therefore, authors of digital content and DVDs typically attempt to steer clear of using any features that have some degree of implementation flexibility. Furthermore, authors of digital content and DVDs usually also steer clear of features of the DVD specification that are known to be implemented incorrectly by certain players.

Ensuring that content will have the broadest market involves testing DVD players for compliance with the DVD specification. It will be appreciated testing is a labour intensive and time-consuming process. As the navigational complexity of the content of a DVD increases and as the number of assets used by the navigation structure or navigation process increases, it becomes impractical to test every possible navigation path manually. Therefore, a tester usually concentrates on a statistically significant subset of all possible navigation paths of the disc in determining whether or not the disc is as intended. However, using a small sample or test space to decide whether or not a disc operates as intended is risky in that errors might still exist in some untested portions of the content.

Similarly, as the number of manufacturers or producers of DVD players increases, the greater the number of players there are with which authored content should aim to be compatible. Again, it would be a labour intensive and time-consuming task to have to test all navigation paths of a DVD using all available players. Therefore, an author might be tempted, again, to use a small sample space of players produced by selected manufacturers or producers and to bear the associated risks.

It is an object of embodiments of the present invention at least to mitigate some of the problems of the prior art.

SUMMARY OF INVENTION

Accordingly, a first aspect of embodiments of the present invention provides a data processing system comprising a controller for processing a data stream comprising data representing at least one of a first video sequence (digitised video data) having associated identification data (unique identifier embedded in the user_data field) and associated navigation data; means (identifier extractor) to identify the associated identification data; means to receive data associated with an output signal of a player for playing the first video sequence; and a correlator (Navigation enumerator and identifier index) to correlate the identification data with the data associated with the output signal from the player to determine whether or not there is a predetermined correlation between the first video sequence and the received data associated with the output from the player.

Advantageously, embodiments of the present invention allow at least the compatibility of player to be tested automatically using, for example, a DVD or DVD-Video image data as a test standard, that is, rather than having a conventional test plan, the DVD or DVD-Video image data is used as and is deemed to be a definitive test standard with which the performance of DVD players is evaluated. It will be appreciated that this might allow significant savings to be made both in terms of time spent testing and labour charges associated with that testing.

A further aspect of embodiments of the present invention provides a method for testing a media player; the method comprising the steps of playing digital content using the media player; the digital content comprising identification data capable of being rendered by the media player; comparing the rendered identification data with a current location within the digital content to determine if there is a correlation between that rendered identification data and the current location; and means for assessing the performance of the player using that comparison.

Another aspect of embodiments of the present invention provides a method for testing a media player; the method comprising the steps of playing digital content using the media player; the digital content comprising identification data capable of being rendered by the media player; comparing the played digital content with the digital content or with a current location within the digital content to determine if there is a correlation between them; and means for assessing the performance of the player using that comparison.

A still further aspect of embodiments of the present invention provides a method for testing a number of media players; the method comprising the steps of playing the same digital content using the media players; the digital content comprising identification data capable of causing the media players to produce respective identifiable outputs; comparing the identifiable outputs with anticipated or expected positions of the media players within the digital content; and assessing the media players in response to that comparison.

Yet another aspect of embodiments of the present invention provides a method for testing a player; the method comprising the steps of playing digital content using the player and determining whether or not the current position of the player within the digital content corresponds to an expected or anticipated position of the player within the digital content.

Preferably, embodiments of the present invention provide a method of testing a player using a test standard in the form of video image data; the method comprising the steps of playing the video image data using at least one player, and preferably a plurality of players, and determining whether or not the output of the player is as anticipated or expected by comparing the processing of that video image data by the at least one player, and preferably the plurality of players, with the processing of that video image data by another player.

By using a DVD-Video image as a standard by which the performance of a player is to be assessed, the reaction or response of the player to that standard can be monitored for compliance with that standard. In preferred embodiments, the image data is known or assumed to be 100% compatible with a DVD standard. Still further, in preferred embodiments, at least one player, that is, a reference player, is also assumed or known to be 100% compatible with one or more of the DVD specifications. The technical specifications prevailing at the date of filing are: DVD specifications for read-only disc: HT DVD-ROM, part 1: physical specifications, version 0.9; DVD-ROM, part 1: physical specifications version 1.0 and part 2: file system specifications, version 1.0; DVD-Video, part 3: video specifications, version 1.1; DVD-audio, part 4: audio specifications, version 1.2; DVD-ENAV, part 5: enhanced DVD specification, version 0.9; DVD specifications for recordable disk: DVD-R (3.9G), part 1: physical specifications, version 1.0 and part 2: file system specifications, version 1.0; DVD-R for general, part 1: physical specifications, version 2.0, and part 2: file system specifications, version 2.1; DVD-R for authoring; part 1: physical specifications, version 2.0 and part 2: file system specifications, version 2.0; DVD specifications for rewritable disc: DVD-RAM (2.6G), part 1: physical specifications, version 1.0 and part 2: file system specifications, version 1.0; DVD RAM (4.7G), part 1: physical specifications, version 2.1 and part 2: file system specifications, version 1.0; DVD specifications for re-recordable disc: DVD-RW, part 1: physical specifications, version 1.1 and part 2: file system specifications, version 1.0; DVD specifications for DVD-RAM/DVD RW/DVD-R for general discs: DVD-VR (video recording) part three: video recording version 1.1; DVD-AR (audio recording), part 4: audio recording, version 1.0; DVD-SR (stream recording), part 5, stream recording, version 1.0, which are incorporated by reference herein for all purposes. The above specifications associated with DVD are available at, for example, http://www.dvdforum.com/tech-dvdbook.htm. Each specification referenced at http://www.dvdforum.com/tech-dvdbook.htm is incorporated herein by reference for all purposes. Alternatively, or additionally, technical information concerning DVDs is available at, for example, http://www.dvd-replica.com/DVD/index.php the content of which is incorporated herein for all purposes. A still further alternative source of DVD technical information can be found, for example, DVD Demystified, Author: Jim Taylor, Publisher: McGraw Hill Education, ISBN: 0071423966, the content of which is incorporated herein by reference for all purposes.

It will be appreciated that a DVD-Video image, that is, data compliant with at least one of the DVD technical specifications, represents an embodiment of digital content.

BRIEF DESCRIPTION OF THE DRAWINGS

Embodiments of the present invention will now be described, by way of example only, with reference to the accompanying drawings in which:

FIG. 10 shows a schematic model of compatibility testing according to embodiments of the present invention.

DETAILED DESCRIPTION OF PREFERRED EMBODIMENTS

Figure 1:
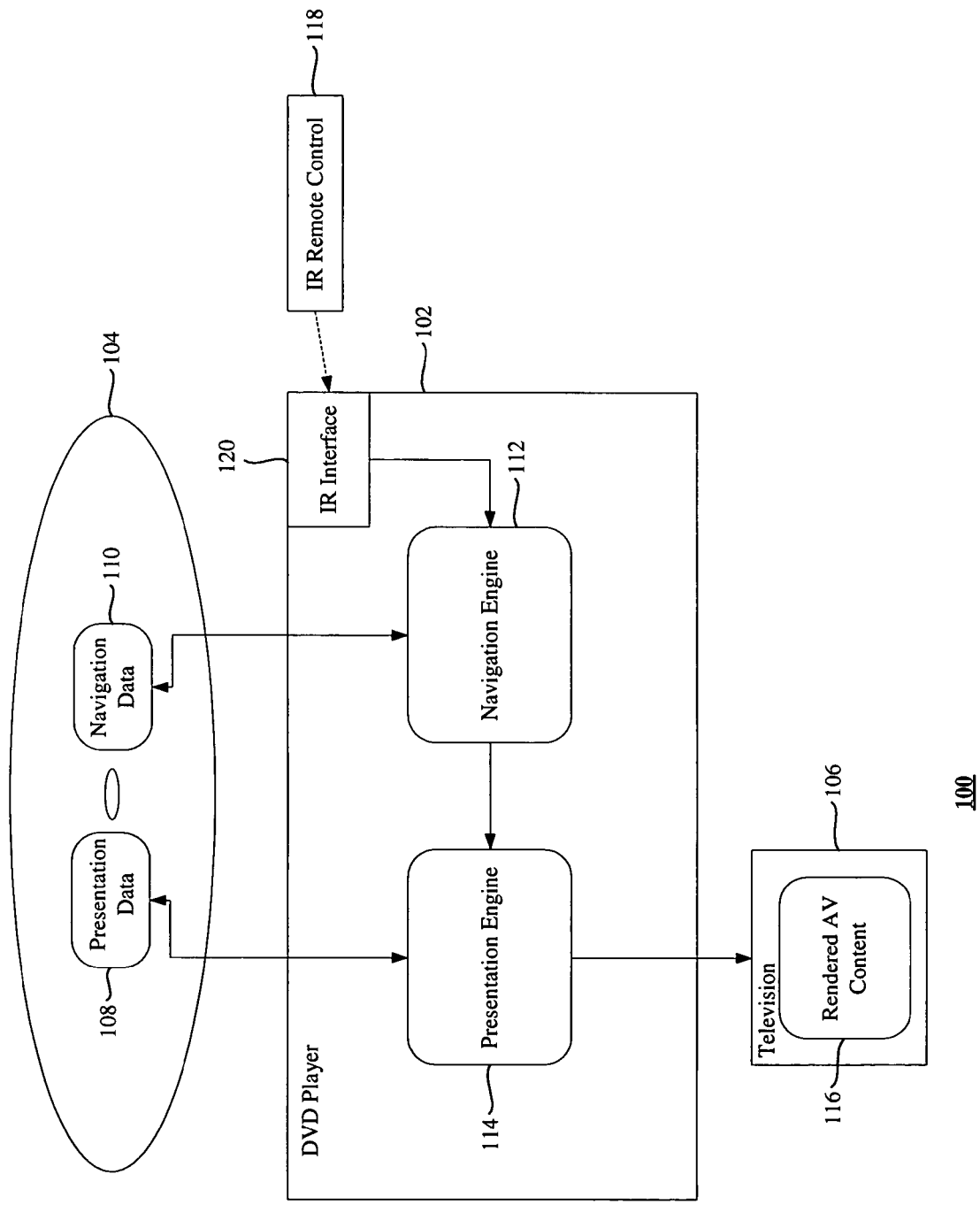
FIG. 1 shows, schematically, a typical home entertainment system comprising a DVD player, a DVD and a television.

FIG. 1 shows, schematically, a typical home entertainment system 100 comprising a DVD player 102, a DVD 104 and a television 106. The DVD 104 comprises presentation data 108 and navigation data 110. The navigation data 110 is used by a navigation engine 112 within the DVD player 102 to control the order or manner of presentation of the presentation data 108 by a presentation engine 114. The presentation engine 114 presents the presentation data 108 via the television 106 as rendered audiovisual content 116. As is well known within the art, the rendered audiovisual content 116, conventionally, takes the form of a movie or photographic stills or text associated with that movie or those stills.

The presentation data and navigation data, that is, the DVD-Video image, comprises audiovisual content that is derived from raw content objects, which include audio content and visual content, and is structured according to a navigation plan that reflects desired transitions and relationships between the parts of the audiovisual content or the raw content objects used to produce the audiovisual content. It will be appreciated by those skilled in the art that data representing or associated with the set of DVD-Video structures also represents an embodiment of a "DVD-Video image". Within an authoring tool, the raw content objects are represents by respective abstractions that are typically icons. It will be appreciated that, for example, such abstractions can be a "scenario" such as is produced by the Scenarist product available from Sonic Solutions.

A user (not shown) can use a remote control 118 associated with the DVD player 102 to influence the operation of the navigation engine 112 via an infrared remote control interface 120. The combination of the infrared remote control 118 and the navigation engine 112 allows the user to make various selections from any menus presented by the presentation engine 114 under control of the navigation engine 112 as mentioned above.

Figure 2:
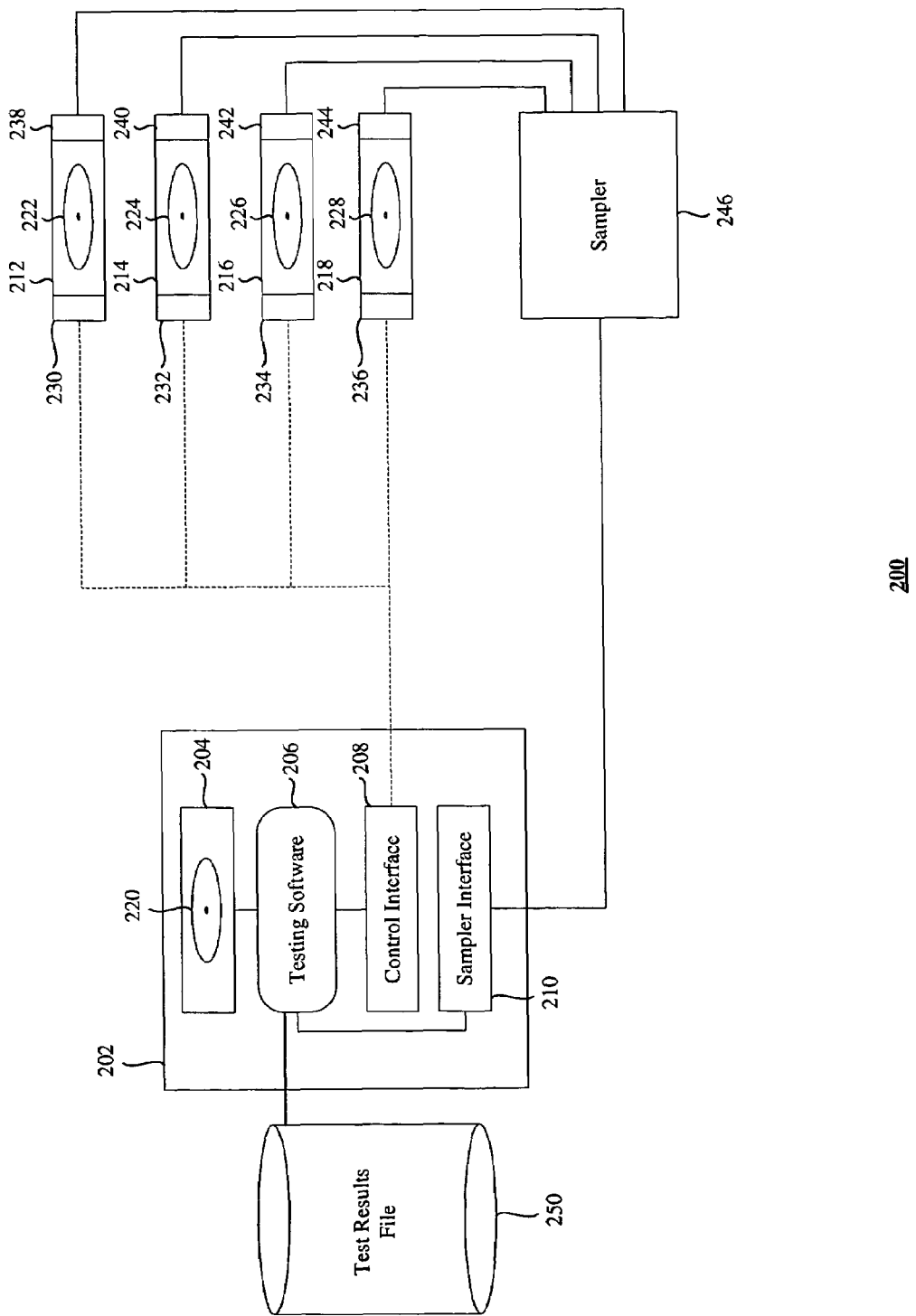
FIG. 2 shows a testing arrangement according to an embodiment.

Referring to FIG. 2, there is shown a testing arrangement 200 using an embodiment of the present invention. The testing arrangement comprises a computer 202 having, or having access to, a reference DVD player 204. The reference DVD player 204, in preferred embodiments, is a modified software DVD player. The reference DVD player 204 is 100% compatible with the DVD specification. The computer 202 also comprises testing software 206 for controlling or managing the overall testing process. A control interface 208 is provided to allow the computer 202 to output control signals in response to commands received from the testing software 206. The computer 202 also comprises a sampler interface 210 for receiving digitised data representing output signals of one or more DVD players 212 to 218. The embodiment shown in FIG. 2 has been illustrated using four DVD players 212 to 218. However, embodiments can be realised in which any other number of DVD players are used. For example, a single DVD player to be tested might be used in other embodiments of the present invention or some other number of DVD players might be used in the alternative.

Each DVD player 212 to 218 is tested against a test standard with reference to the operation of the reference DVD player 204. In preferred embodiments, the test standard is realised in the form of a DVD-Video image that is, preferably, stored on an associated disc 220 to 228. Each of the DVD players 212 to 218 under test comprises a control interface 230 to 236 via which the DVD players 212 to 218 can receive control commands or signals output by the control interface 208 of the computer 202. Each DVD player 212 to 218 under test also comprises a respective output interface 238 to 244 via which signals intended to drive a TV or other display device (not shown) are output. The output signals might comprise at least one of a composite signal, SCART signals, S-video signals or any other TV or display device compatible signal.

It will be appreciated that, in the embodiment illustrated, the output interfaces 238 to 244 are connected to a sampler 246. The sampler 246 is arranged to analyse the output signals obtained via the output interfaces 238 to 244 to extract, or at least digitise, a predetermined identifiable output or predetermined identifiable data contained within, forming part of or associated with those output signals. The sampler 246 forwards any such identifiable output or identifiable data to the sampler interface 210 for subsequent analysis by the testing software 206.

The computer 202 has an associated non-volatile storage 250 that is used to store any test results following from the actions of the testing software 206.

Figure 3:
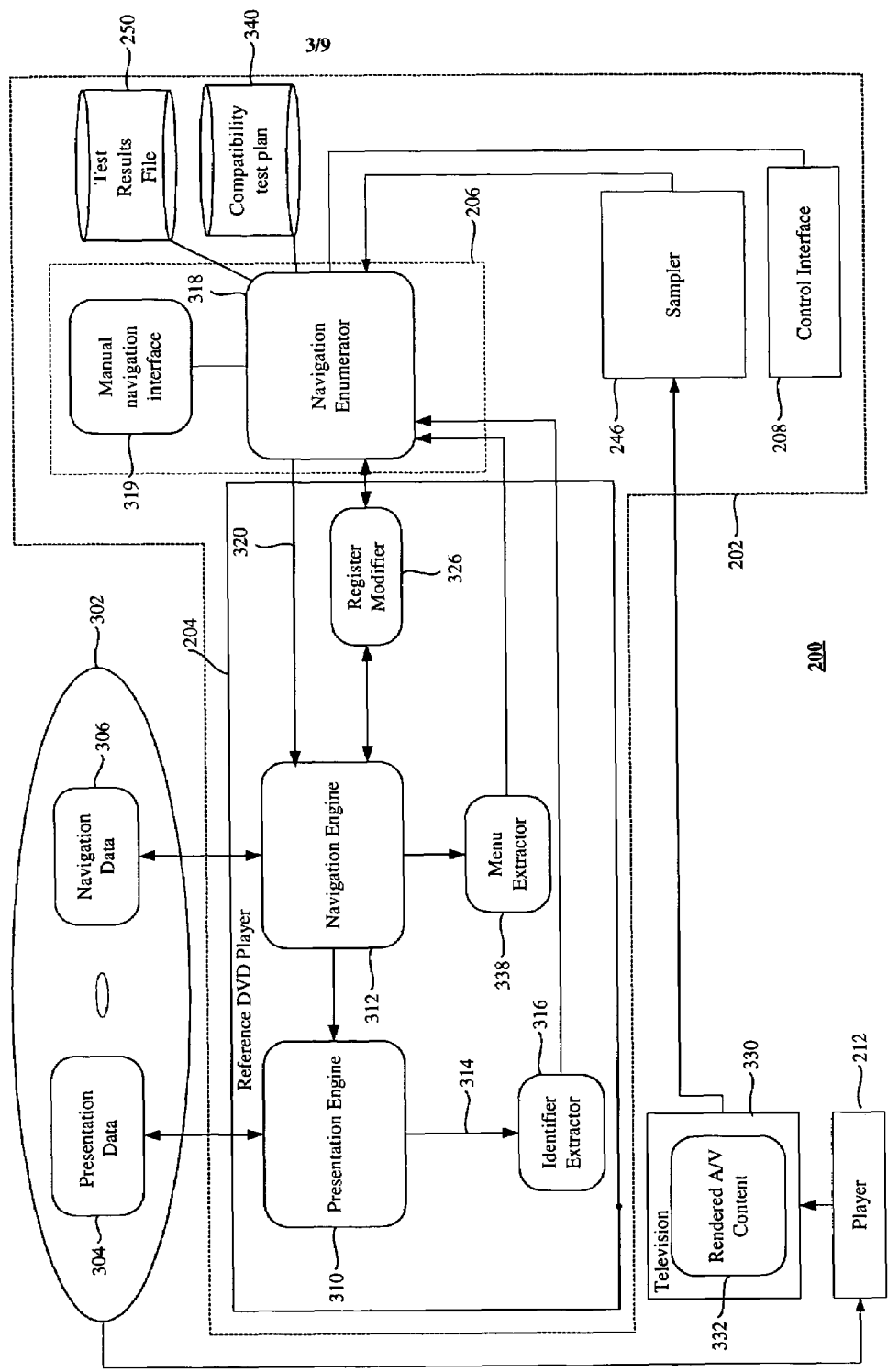
FIG. 3 illustrates a first embodiment of at least part of the present invention.

Referring to FIG. 3, there is shown the testing arrangement 200 in greater detail according to an embodiment of the present invention. FIG. 3 shows a DVD disc 302 storing presentation data 304 and navigation data 306, that is, storing a DVD-Video image. The DVD-Video image represents an embodiment of a test standard. The reference DVD player 204 comprises a respective presentation engine 310 and navigation engine 312. In preferred embodiments, the reference DVD player 204 is a software player, that is, it is executable by the computer 202 such as, for example, a desk-top PC or other computer. The reference DVD player 204 is used to traverse or analyse the test standard and to check whether or not a player such as, for example, the player 212, under test operates as intended or as predicted in response to the test standard, that is, in response to playing the DVD-Video image, as compared to the operation of the reference DVD player 204.

It will be appreciated that the presentation data 304 comprises a number of audiovisual assets (not shown). Preferably, at least one of the video or audio assets is encoded during the authoring process to have an associated unique identifier or to contain data from which such identification data can be derived. Alternatively, only selected video or audio assets might be encoded with such an associated unique identifier. For example, when encoding video data, that is, a video sequence, to produce a corresponding MPEG video stream, the unique identifier might be placed in the user_data field of the MPEG video stream as defined by the MPEG-2 standard. The unique identifier allows the associated video asset to be identified. In a preferred embodiment, the reference player 204 processes the presentation data stream 314 using an identifier extractor 316. The identifier extractor 316 extracts the data representing the unique identifier from the user_data field of the MPEG elementary video stream 314 and forwards the unique identifier to a navigation enumerator 318. The navigation enumerator 318 forms part of the testing software 206.

In preferred embodiments, the unique identifiers are embedded within the MPEG streams during authoring. This has the advantage that an association can be created more readily between a unique identifier and an abstraction representing the raw content or raw content object from which the MPEG stream is derived. Alternatively, or additionally, prior to testing a player using audiovisual content, the content can be traversed to assign unique identifiers to each, or selected, MPEG streams, which will allow the navigation through that content to be tracked using the unique identifiers.

Furthermore, in preferred embodiments, the assets are also arranged during authoring to cause a player to produce an identifiable output in the form of, for example, an output signal or portion thereof or identifiable output data, which can be extracted from such an output signal. The identifiable output is used within embodiments of the present invention to identify where within the DVD-Video image a player is currently, ie the current location within the DVD-Video image of the player. It will be appreciated that the unique identification data and the identifiable output can be used by the testing software to track the progress of a player under test through the test standard and to compare that progress with an anticipated or expected progress.

In preferred embodiments, the navigation enumerator 318, in effect, replaces the infrared remote control 118 mentioned above. The navigation enumerator 318 generates control signals that influence the operation of the navigation engine 312 in substantially the same manner as the infrared signals from the remote control 118 influence the operation of the navigation engine 112 above. The same control signals generated by the navigation enumerator 318 are output to the control interface 208 for generating signals for controlling or influencing the operation of the or a player under test such as the player 212 illustrated in FIG. 3.

The operation of the navigation enumerator 318 is responsive to a compatibility test plan 340. The compatibility test plan 340 comprises data for testing at least one path, and preferably various navigation paths, though the DVD-Video image that is used as the test standard. The compatibility test plan 340 preferably contains data representing or from which the control signals generated and output by the navigation enumerator can be produced. Optionally, the test plan might also contain an indication of the identifiable output or identifiable data anticipated as being encountered for each navigation path through the test standard together with the unique identifiers for the assets of those paths.

In preferred embodiments, the test plan 340 might comprise at least one of a start point, which can be defined in terms of initialisation data for initialising the DVD player's registers, for example, an indication of anticipated events or outputs expected to be produced by the player, unique identifiers associated with those events or outputs and commands that are intended to simulate menu selections or button commands, that is, user input actions. The navigation enumerator 318 comprises a copy of each identifier incorporated into the presentation data 304 together with respective references to high-level abstractions of the assets associated with the unique identifiers. Preferably, the compatibility test plan will also comprise data associated with the control of the players to allow the operation of an associated infrared controller to be emulated, that is, the IR commands that are specific to each player are emulated using data stored within or forming part of the compatibility test plan. In practice, the testing software will have access to the sets of IR control commands or signals for generating such commands, preferably via the test plan, for controlling respective DVD players. Although the embodiment schematically illustrated in, for example, FIG. 2 has a control interface 208 that controls the plurality of players, it will be appreciated that the control interface will preferably be implemented as a plurality of IR remote controls arranged to control respective DVD players. In preferred embodiments, an IR remote control associated with a respective DVD player should be placed in close proximity to the IR input of the DVD player or otherwise arranged so that the respective DVD player receives the IR signals from that IR remote control and is unfettered by the presence of IR signals from other IR remote control devices associated with other DVD players. Embodiments can be realised in which the IR signals from the IR remote control devices are carried via a medium to the respective IR inputs of the DVD players. In preferred embodiments, the medium might be glue arranged to maintain the output port of the IR remote control device in an appropriate relationship relative to the IR input port of the DVD player. Alternatively, an optical guide could be used to carry the IR signals from the output port of the IR remote control to the IR port of a DVD player.

The current position within the test standard is maintained or managed by the navigation enumerator 318 using the unique identifiers produced by playing the test standard on the reference player 204.

A register modifier 326, preferably forming part of the reference DVD player 204, is used to read and/or modify the settings of selectable registers of at least one of the GPRMs and SPRMs of the reference DVD player 204. The register modifier 326 is operated under the control of the navigation enumerator 318 to cause the navigation engine 312 to access and give effect to the navigation data 306 in a predetermined manner or according to the requirements of the test plan 340.

In effect, the register modifier 326 controls the traversal of the disc 302 or access to the digital content stored on the disc 302 to allow each, or selected, navigation paths through the digital content to be explored and associated audiovisual assets retrieved and rendered or processed to identify matches, or mismatches, between those assets and the assets output by the player or players under test.

Preferably, the embodiments also comprise a menu extractor 338. The menu extractor is used to intercept or process presentation data that identifies a current menu being processed. It will be appreciated that the presentation data can comprise menu data within or associated with an MPEG stream and that such an MPEG stream can have an associated unique identifier. Therefore, a unique identifier can also be used to identify a corresponding menu within the current presentation data stream. Hereafter, a unique identifier associated with a menu will be referred to as menu identification data. Again, the navigation enumerator 318 uses the data output by the menu extractor 338 to track or identify the current location within the test standard, that is, the current location within the DVD-Video image data or, more specifically, the current menu being output by the or a player currently under test.

The sampler 246 is arranged to extract the identifiable output from the output of, or signals produced by, the player 212. In some embodiments, the identifiable output might comprise, for example, an artefact, such as, for example, a black region of image data of an associated video sequence, containing an associated number, or data encoded within or forming part of the so-called "Line-21" data, which might, again, contain a unique number associated with a video sequence currently being played. Alternatively, or additionally, the current position within the DVD-Vvideo image data can be identified using at least one of an audio or visual watermark that is not perceivable by humans during output but which can be detected by appropriate signal processing. For example, an audio stream of the DVD-Video image data might comprise identification data encoded in an unperceivable manner that takes advantage of a psychoacoustic model of human hearing.

The navigation enumerator 318 uses the extracted identifiable output, which provides an indication of the actual or current position of the player within the test standard, that is, within the DVD-Video image, and the unique identification data, which provides an indication of anticipated or expected position of the player within the test standard, that is, within the DVD-Video image, to determine whether or not the player 212 currently under test is performing as anticipated. In effect, the navigation enumerator 318 compares the actual or current position of the player 212 under test with the position of the reference player 204, ie with the current position of the computer's 202 reference player 204. If the two positions are comparable, a record to that effect is optionally written to the test results file 250. Alternatively, or additionally, if the two positions are not comparable, a record to that effect with written to the test results file 250.

In preferred embodiments, the reference DVD player 204 comprises a manual navigation controller 319 that presents an interface to a user (not shown) that can be used to influence the operation of the DVD players 204 and 212 or any other player under test. In effect, manual control commands can be issued to any of the DVD players via the manual interface. Furthermore, in preferred embodiments, the manual interface can be used to record a sequence of commands issued manually so that they can be used to form part of the compatibility test plan 340. This advantageously allows the manually created portion of the compatibility test plan to be retrieved and invoked automatically and repeatedly. For example, a predetermined sequence of menu button activations can be constructed, that is, recorded, using the manual navigation interface. The constructed sequence of menu button activations can be intended to support traversal of the test standard to a desired position within the test standard. Furthermore, the sequence of actions created using the manual navigation interface can be used as part of the overall compatibility test plan.

In preferred embodiments, the sampler is arranged to sample the output signals of a number of players to compare the respective locations of those players within a DVD-Video image with the anticipated or expected locations of those players within the DVD-Video image as will be appreciated from FIG. 2, which illustrates four players 212 to 218 as being tested.

Figure 4:
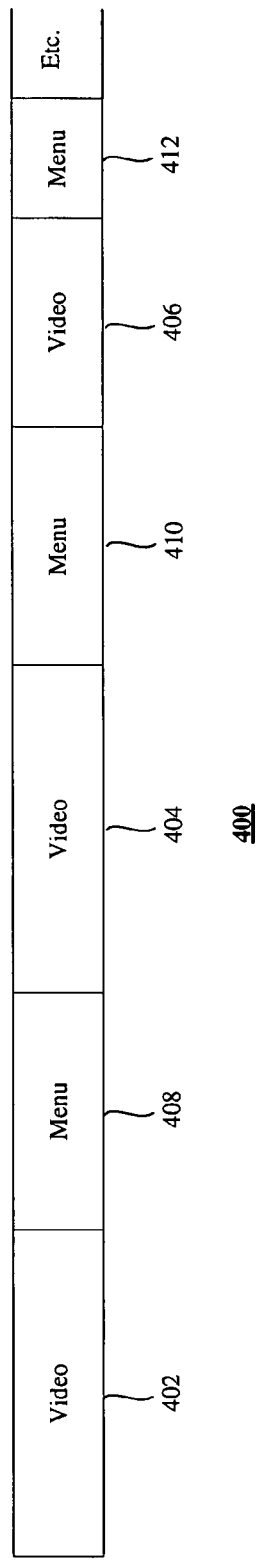
FIG. 4 shows a schematic model of the playback of a DVD.

Referring to FIG. 4, there is shown, schematically, a model of playback for DVD players from a viewer's perspective. The model 400 typically comprises a number of video sections 402, 404, 406 interspersed with menu sections such as, for example, menu sections 408, 410 and 412. The user is required to select from any options presented in or available via the menus so that playback can continue. It will be appreciated that each user selection may cause a different section of video to be output. It will also be appreciated that, given a number of menus interspersed with a number of possible video sections, there might be a significant number of navigation paths through the data stored on a DVD.

Figure 5:
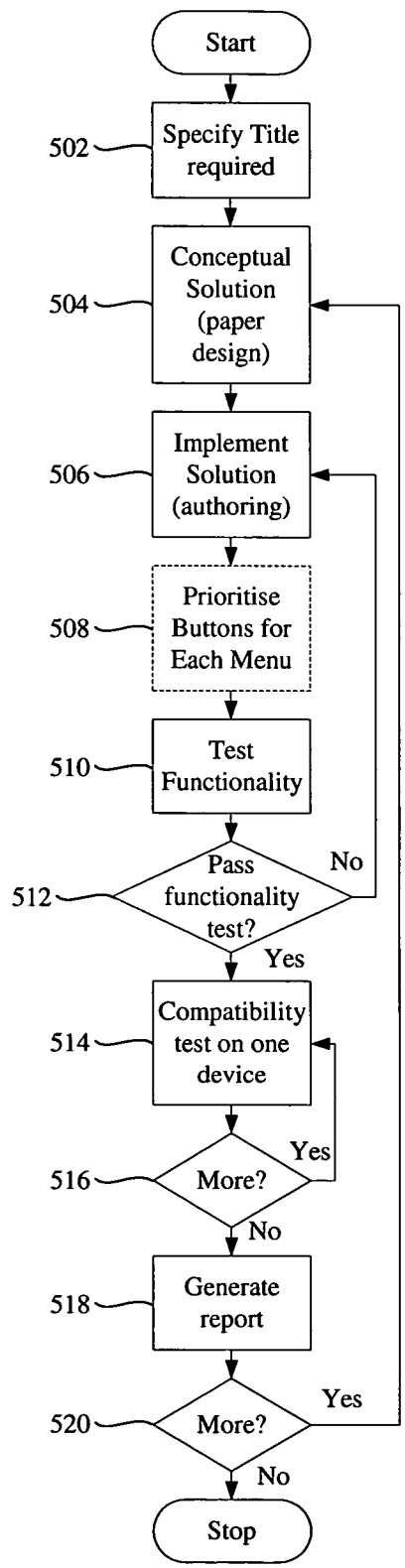
FIG. 5 illustrates a flowchart of an overall DVD design, authoring and testing process.

Referring to FIG. 5, there is shown a flowchart 500 of a generalised design, authoring and testing process or method for ensuring that video image of, for example, a DVD and/or DVD player complies with the title requirements. At step 502, one skilled in the art specifies a required title. The conceptual solution to the specified title, that is, the paper design, is usually realised next as can be appreciated from step 504. Having produced the conceptual solution for the DVD, that conceptual solution is implemented, that is, authored at step 506. Within an optional step, that is, step 508, one skilled in the art can prioritise the invocation of any buttons or choices available in corresponding menus so that, during any subsequent testing, the buttons or choices are invoked or selected according to their respective priorities.

Typically, a functionality test is then performed at step 510 to ensure that the DVD video image complies with the title requirements. A determination is made, at step 512, as to whether or not the functionality test was passed. If it is determined at step 512 that the functionality test was failed, processing usually returns to step 506 to amend the implemented solution of the conceptual design. However, if the determination at step 512 shows that the DVD-Video image complies with the DVD specification, the DVD-Video image is used as a test standard to test the compatibility of a target DVD player at step 514 with the test standard. It will be appreciated that the DVD-Video image and any DVD created using that image is assumed to be 100% compliant with the DVD specification when it is used as a test standard.

A determination is made at step 516 as to whether or not there are further players or devices to be tested using the DVD-Video image. If the determination at step 516 is positive, a next or different player is selected for testing and processing returns to step 514. However, if the determination at step 516 shows that there are no more players to be tested, a test report is generated at step 518. The test report might comprise an indication of which tested devices or players passed the compatibility test undertaken at step 514 and a list of devices or players that failed that test together with an indication of which aspect of the test they failed.

Usually the generated report is used to determine whether or not a player is acceptable or that the DVD-Video image used as a test standard is acceptable. Therefore, at step 520, an analysis of the report is performed to determine whether or not it is acceptable. If the analysis at step 520 shows that the report is unacceptable, one skilled in the art might be inclined to modify, for example, the conceptual solution arrived at in step 504, change the implemented or authored solution in step 506, or take some other form of corrective action in light of the generated report. The intention behind taking the corrective action is to attempt to eliminate the features or aspects of the DVD-Video image that relied upon or revealed the incompatibility or anomalous operation. It will be appreciated by one skilled in the art that authoring a DVD-Video image to have as few incompatibility issues as possible will increase the range of players on which that digital content can be played without error or without any anomalous actions or results manifesting themselves. Therefore, an aspect of embodiments of the present invention relates to authoring digital content to at least reduce and preferably eliminate incompatibility issues. It can be appreciated that even though the digital content or DVD-Video image is 100% compatible with the appropriate DVD specifications, there might be occasions when it would be prudent to change the content in an attempt to widen the appeal of that content and widen the range of players on which it will play without any form of anomalous operation becoming evident.

However, if the analysis at step 520 shows that the generated report is acceptable, the design, implementation and testing process is deemed to be complete, that is, the digital content might be deemed to be ready for the next stage of processing such as, for example, being written to DLT in preparation for creating a master.

Figure 6:
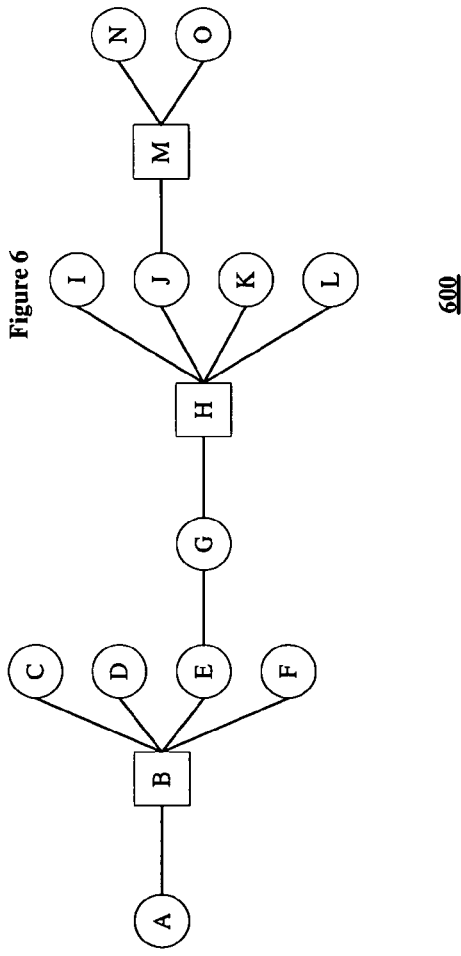
FIG. 6 depicts notional and selected navigation paths of an embodiment of a DVD-Video image.

Considering, again, the playback model and navigation paths described above with reference to FIG. 4, it can be appreciated from, for example, FIG. 6 that a disc may have a number of navigation paths as illustrated by the schematic representation 600 of the navigation paths of a theoretical or notional disc or of a DVD-Video image. Node A of these navigation paths is associated with an initial video sequence. Once that video sequence has concluded, it leads to node B within the navigation path structure 600. Node B is associated with a menu. In the illustrated embodiment, node B has four choices that are associated with respective video sequences as schematically illustrated by nodes C, D, E and F. Therefore, when processing the DVD-Video image, a user, upon reaching node B, will be presented with a menu and will be required to select from that menu before they can continue. In the structure 600 illustrated, it can be appreciated that a notional user has selected the third menu option that relates to a navigation path including node E. It can be appreciated that the selected navigation path continues through node G, where a corresponding video sequence will be output, to a further menu node, that is, node H. Again, menu node H has a number of choices that can be selected by the user. For the purpose of illustration, the navigation structure 600 illustrates the selection of the second node, that is, node J. Therefore, the video sequence associated with node J is output and the navigation path continues to a still further menu node, node M, which has two choices. It will be appreciated that the user can traverse the navigation paths or navigation structure by making various choices at each of the menu nodes, which, in turn, affect the actual navigation path taken through the DVD video image.

Figure 7:
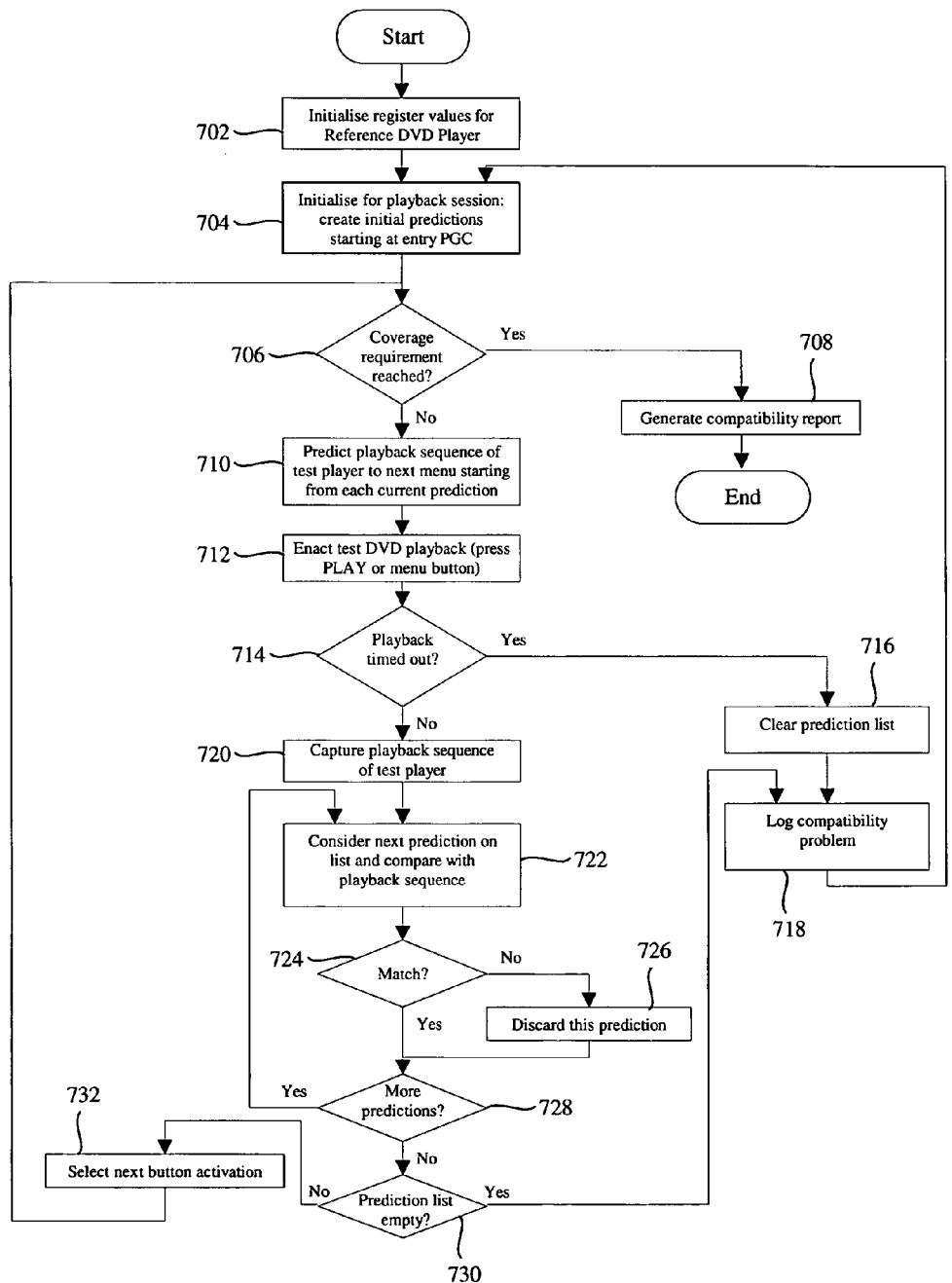
FIG. 7 illustrates a flowchart for compatibility testing of a DVD player.

Referring to FIG. 7, there is shown a flowchart 700 for testing the compatibility of a DVD player. At step 702, the software reference DVD player 204 is initialised with appropriate register values. At step 704, initialisation for a playback session takes place. This initialisation involves creating an initial set of predictions, that is, a prediction list, based upon or starting from an entry PGC. A prediction, in preferred embodiments, comprises establishing a data set representing an anticipated state and/or anticipated output result of a player currently under test. For example, the prediction might comprise at least one of the following: an initial state of the GPRMs of the reference player, a final state of the GPRMs of the reference player, and data identifying or associated with a playback sequence or the playback sequence itself. For example, each playback sequence might comprise a number of video sequences with each video sequence having a respective identifier and/or indication of duration. Optionally, the prediction might also contain data associated with the presentation stream produced by the reference DVD player 204, which can be used in a comparison with the respective data derived from or associated with the players under test.

A determination is made, at step 706, as to whether or not a coverage requirement has been met, that is, a determination is made as to whether or not all of the navigation paths, or a sufficient number of the navigation paths, through the DVD-Video image have been traversed. If the determination at step 706 is positive, a compatibility report is generated at step 708. However, if the determination at step 706 is negative, a prediction associated with a playback sequence up to the next menu or decision point from a current position within the current navigation path through the DVD-Video image is constructed. At step 712 control commands, issued via the control interface 208, are issued to at least one of the DVD players 212 to 218 currently under test. For a given DVD player under test, a determination is made, at step 714, as to whether or not playback has timed out in response to the command issued at step 712. If the determination at step 714 is that playback has timed out, the current prediction list is cleared at step 716. Processing then continues at step 718 where the compatibility problem, that is, the playback time out problem is noted. Thereafter, processing returns to step 704 where initialisation for the next playback session is undertaken.

However, if the determination at step 714 is such that a playback sequence has not timed out, that is, if the current DVD player under test starts to play a playback session or sequence or series of video sequences in response to the command issued at step 712, that video sequence, or at least, for example, identification data associated with or derived from that video sequence, is captured at step 720 for subsequent analysis.

It will be appreciated that a prediction associated with playback of a sequence made at step 710 will typically comprise a number of predictions each of which are associated with respective video sequences or chains of video sections or a number of possible future navigation paths. Therefore, at step 722, a current prediction or portion of an overall prediction associated with an anticipated current playback sequence is compared with a respective portion of the actual playback sequence or compared with identification data associated with or derived from a respective portion of the actual playback sequence. A determination is made at step 724 as to whether or not there is a match between a current prediction associated with the playback sequence and the actual playback sequence or data associated with or derived from the playback sequence that actually resulted in response to the command issued at step 712. If it is determined at step 724 that there is not a match between the current predication and the playback sequence, the current prediction is discarded. In effect, the potential navigation tree associated with the predictions is pruned to discard predictions that are not associated with the actual navigation path taken by a player under test.

However, if the determination at step 724 is positive, a check is made at step 728 as to whether or not there are more predictions associated with the current playback sequence. If there are more predictions associated with the current playback sequence, processing continues from step 722 where the next prediction associated with the anticipated playback sequence is compared with a respective or anticipated portion of the current actual playback sequence. However, if the determination at step 728 is negative, processing continues from step 730 where a determination is made as to whether or not a current prediction list is empty. It will be appreciated that a prediction list might comprise a prediction or a number of predictions associated with a single possible navigation path or a number of possible navigation paths. The prediction might comprise a number of predictions, that is, a prediction list, in situations where the future action or actions of a player under test is not immediately deterministic such as, for example, when a future navigation path cannot be predicted due to a random or non-deterministic aspect of the navigation being encountered. This occurs, for example, when the random number function, RND, is encountered.

If the determination at step 730 is positive, a compatibility problem is logged at step 718. Thereafter, processing continues from step 704. However, if the determination at step 730 is negative, the testing software 206 is aware that it has reached a menu or decision node in the navigation structure through the DVD-Video image and that a choice or menu button needs to be activated. Therefore, such activation is undertaken at step 732 and, thereafter, processing returns to step 706.

Figure 8:
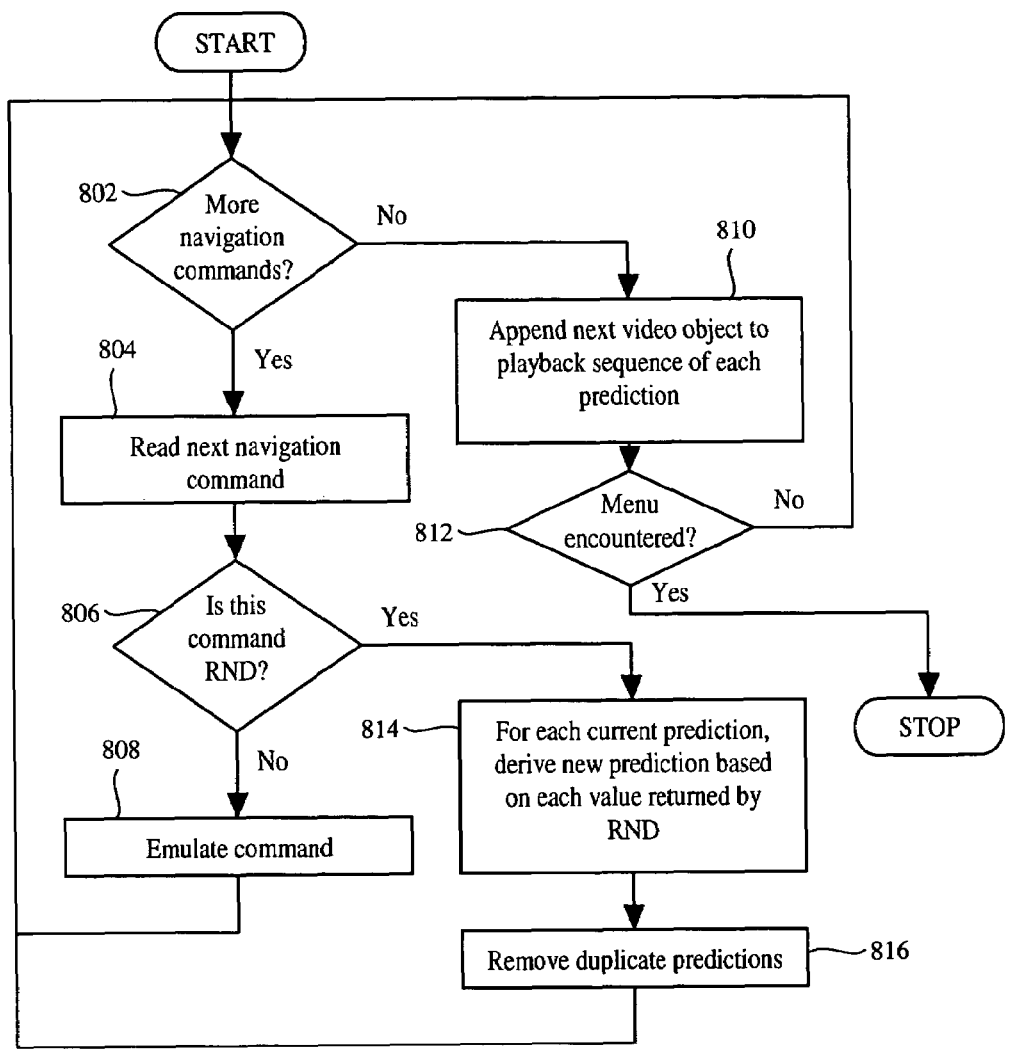
FIG. 8 shows a flowchart for testing constructing a prediction from the DVD-Video image.

Referring to FIG. 8 there is shown a flowchart 800 of the actions or operations performed in step 710 shown in the flowchart 700 of FIG. 7. A determination is made at step 802 as to whether or not a particular path or branch of a navigation path through the DVD-Video image comprises further navigation commands. If the determination at step 802 is positive, the next navigation command of the current path is read at step 804. A check is made at step 806 as to whether or not the read navigation command corresponds to the RND function. If the navigation command is not identified at step 806 as a RND function, effect is given to that command or, more accurately, the command is emulated within the testing software 206 at step 808. Thereafter, control returns to step 802 to identify and process the next navigation command in a current navigation path, if any.

If the determination at step 802 is negative, the next video object is appended to the current playback sequence at step 810 or, more accurately, a current playback sequence is constructed from the series of navigation commands whose effect has been emulated or anticipated in the respective iterations of step 808. Alternatively, or additionally, identification data associated with or derived from the video sequences associated with the current series or string of navigation commands within the current navigation path are identified at step 810 for use in later correlation with anticipated corresponding data identified within or derived from an actual playback sequence associated with a respective media player under test. A determination is made at step 812 as to whether or not a menu has been encountered. If a menu has not been encountered, processing returns to step 802. However, if the determination at step 812 is that a menu has been encountered, the predicted playback sequence is deemed to be complete and processing continues from step 712 where appropriate commands are issued from the control interface 208 to a respective DVD player that is currently under test.

Returning to step 806, if the determination is that the navigation command is a RND command, a number of possible or potential navigation or prediction paths exist according to the value returned by the RND function. Clearly, the reference player 204 does not know how a RND function of a given player under test has been implemented and cannot anticipate the RND value produced. Therefore, embodiments of the present invention create a number of possible predictions or navigation paths, that is, a prediction list, according to the range of possible values returned by the RND function, which has a maximum value of 16,384 as dictated by a corresponding DVD specification. Therefore, any navigation path involving a RND function can theoretically give rise to 16,384 potential onward navigation paths depending upon the argument supplied to the RND command. In preferred embodiments, predictions for each of these possible paths are created at step 814 and duplicate predictions are removed at step 816. It will be appreciated that a number of predictions will be created for each potential navigation path following the RND function. When the actual playback sequence is captured and processed at steps 720 and 722, the testing software 206 should ultimately be able to determine the navigation path selected as a consequence of the RND function. This allows the redundant predictions associated with RND values other than the one actually generated by a player under test to be discarded.

It will be appreciated that the apparent value returned by the RND function should be capable of being deduced from the actual navigation path taken by a player under test. However, it will be appreciated that evidence of the apparent value returned by the function might not manifest itself immediately since, in some instances, the RND function might be called in advance of the returned value being needed or used. Therefore, an delay might be encountered before the navigation tree can be effectively pruned via steps 722 to 726.

It should, however, be noted that if the actual navigation path taken by a player under test does not correspond to one of the navigation paths predicted as being a potential navigation path in light of the RND seed, the reference player can deduce that an error has occurred and that there is a compatibility issue that should be addressed.

Still further, it will be appreciated that identifying a match between one of the predictions in the list and the actual navigation path taken by a player under test does not necessarily guarantee that the player under test behaved correctly. For example, the RND function within a player under test might have returned the value 2. However, the player under test might have taken a navigation path more properly associated with the value 3.

Figure 9:
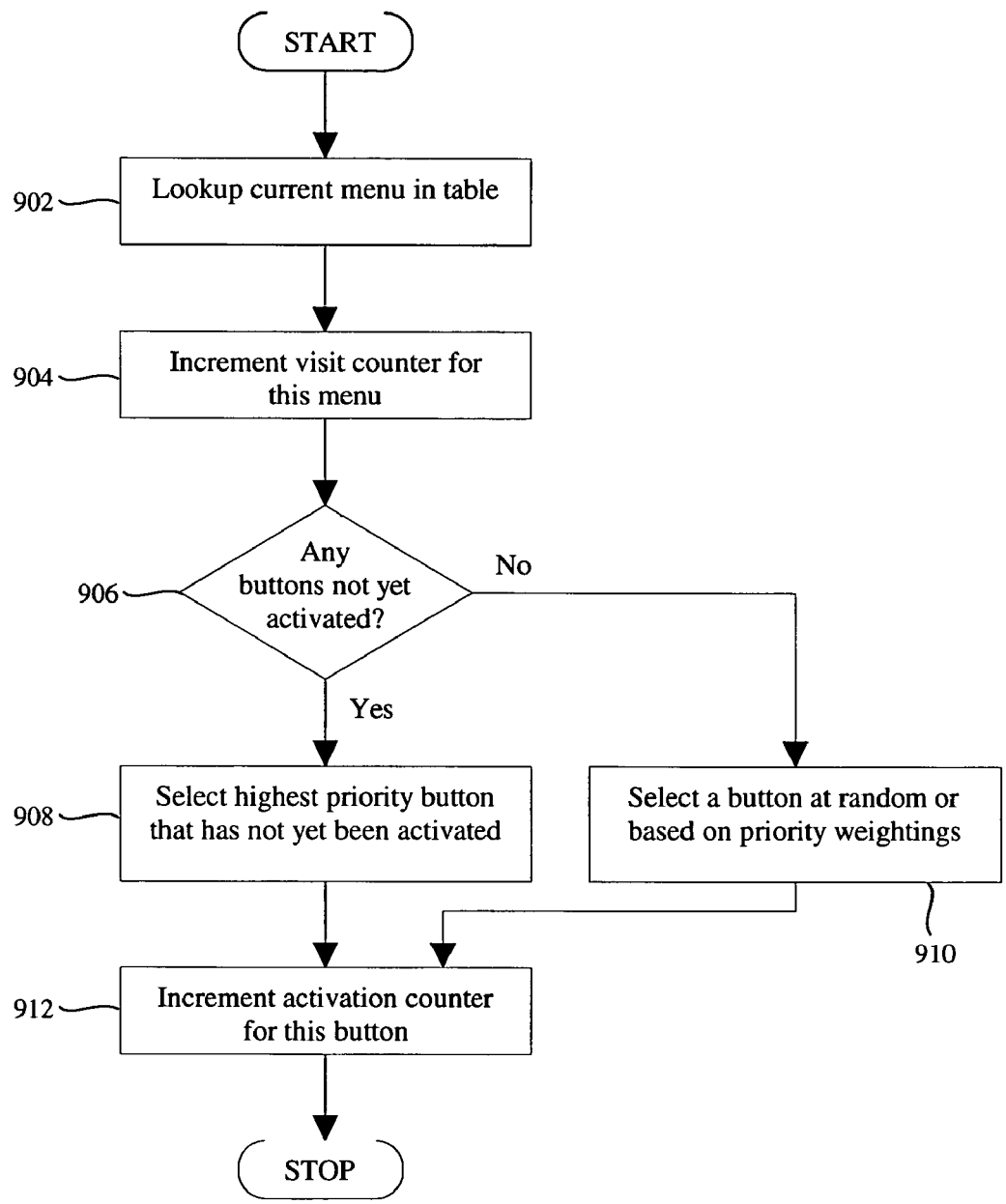
FIG. 9 depicts a flowchart for processing button selections of a menu.

FIG. 9 shows a flowchart 900 of the steps involved in implementing the "select next button activation" step 732. Data associated with each possible menu is retrieved from a data base (not shown) of menu table entries. A menu table entry comprises a menu identifier, parameter or variable for tracking the number of times a menu has been encountered, data identifying the number of buttons associated with a menu and a button table. The button table comprises a set of data identifying buttons, associated activation priorities and associated activation counts, which reflect the number of times corresponding buttons have been invoked by the testing software 206. Therefore, when step 732 is encountered, the menu table entry corresponding to current menu is identified at step 902. The data recording or representing the number of visits to that menu is updated at step 904. A determination is made, at step 906, as to whether or not the current menu has any buttons that have not yet been activated. If the determination at step 906 is positive, the priorities of the unactivated buttons are compared and the unactivated button having the highest priority is selected for subsequent activation at step 908. However, if the determination at step 906 is negative, one of the buttons of the current menu can be selected at random or selected based on a respective priority weighting at step 910. The associated activation counter for a selected button of a current menu is incremented at step 912. Thereafter, control returns to step 732 where the selected button is activated.

FIG. 10 illustrates a time line 1000 showing the actions undertaken by the testing software 206 or controller in analysing a test standard, that is, in analysing the navigation paths through the DVD-Video image and the actions taken by a DVD player currently under test. It can be appreciated that the testing software 206 undertakes an initialisation and prediction phase of operations 1002 in which a current navigation path through the DVD-Video image is analysed to predict the response of a DVD player currently under test to commands to take or traverse that navigation path. The DVD player currently under test then has a playback phase 1004 comprising a video playback phase 1006 and a menu phase 1008 during which a series of video sequences are output followed by the output of a menu respectively. Substantially concurrently with the playback or response phase 1004, the testing software 206, in conjunction with the sampler 246, monitors the response or output of the DVD player currently under test during a monitoring phase 1010. The testing software 206 then undertakes a comparison or assessment phase 1012 in which initial predictions associated with the current navigation path through the DVD-Video image are compared with the actual navigation path taken by the DVD player currently under test to determine whether or not there is a compatibility issue. This assessment phase 1012 also comprises a phase for selecting the next navigation path through the DVD-Video image and for formulating any predictions associated with that navigation path. In response to the predictions made during the assessment phase 1012, the DVD player currently under test, in response to appropriate commands determined during the assessment phase 1012, once again, has an output phase 1014 comprising a playback phase 1016 and a menu phase 1018. It will be appreciated that this model of predict, playback, menu, assessment and selection of the next navigation path will be repeated until, preferably, all possible navigation paths through a DVD-Video image have been tested or exhausted or until a sufficient or predeterminable number of such navigation paths have been explored.

It will also be appreciated that the processing described above will preferably be performed many times as each one of a number of players is tested. The testing of a number of players simultaneously can proceed in at least two ways. The complete test standard can be implemented on a player with that player being tested alone, that is, the whole of the DVD-Video image can be played on a player and the response of that player noted. Alternatively, portions of the test standard, that is, DVD-Video image, can be tested on each player and the response of those players can be noted in parallel. In effect, a number of players can be tested in series or in parallel. Preferred embodiments test the players in parallel.

Preferred embodiments of the present invention can be realised in the form of a software reference DVD player that is modified to allow the presentation engine 310 to extract and output the unique identifier contained within the user_data field of the MPEG elementary video stream. Such an embodiment can also be modified to allow the navigation engine or navigation manager 312 to output data identifying the current menu to allow the menu extractor 338 to inform the navigation enumerator 318 of the current menu. In preferred embodiments, the menu extractor 338 forms part of the navigation engine 312.

Although the above embodiments use a unique identifier inserted into the user_data field of the MPEG elementary video stream as a reference, embodiments are not limited to such an arrangement. Embodiments can be realised in which, for example, the video stream has some other form of associated unique identifier data. For example, the MPEG elementary video stream might comprise a finger print that can be extracted by the identifier extractor and used as a reference to allow the navigation enumerator to correlate a current position on, or event associated with, the data stored on the disc with an anticipated position or event. Alternatively, or additionally, the video represented by the MPEG elementary video stream might comprise "Line 21" data. In effect, the "Line 21" data comprises a unique identifier associated with each, or selectable, video sequences to be processed during authoring. It will also be appreciated that the identifiable output used by embodiments of the present invention might also use, for example, a finger print or Line 21 data to provide an indication of the actual position of a player within a DVD-Video image.

Although the above embodiments have been described with reference to testing physical DVD players, embodiments are not limited to such an arrangement. Embodiments can equally well be realised in which the players under test are software players with the control commands issued by the control interface being replaced by control commands appropriate to the input streams for the software players. Furthermore, it will be appreciated that physical DVD players and software DVD players represent embodiments of media players.

It will be appreciated that the above embodiments have been described with reference to a reference player playing or processing the digital content and to the extraction of data from the presentation and/or navigation streams of that reference player. However, it will be appreciated by one skilled in the art that the data used in embodiments of the present invention can be derived from the DVD-Video image without using a reference player that actually plays the DVD-Video image. The data used in the embodiments of the present invention can be obtained by analysing the DVD-Video image. However, using a reference player represents a convenient manner of obtaining the data used by embodiments of the present invention.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings) and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method for testing the navigational response of a digital content player, the method comprising:
    playing digital content using the digital content player, the digital content being arranged to cause the digital content player to produce an assigned identifiable output;
    ascertaining a current playback position with respect to a navigation structure of the content using the assigned identifiable output;
    determining whether the ascertained position corresponds to an anticipated or expected position within the digital content; and
    assessing the player using that determination.

2. The method as claimed in claim 1, wherein said ascertaining comprises sampling an output signal of the player and extracting the identifiable output from the sampled output signal.

3. The method as claimed in claim 1 wherein said ascertaining comprises comparing the identifiable output with identification data associated with the digital content.

4. The method as claimed in claim 1 further comprising creating, via a user interface, a plurality of control commands to be issued to the player.

5. The method as claimed in claim 1, wherein the digital content has been verified as complying with an associated technical standard.

6. The method as claimed in claim 5 further comprising verifying that the digital content complies with the associated technical standard.

7. The method as claimed in claim 5 wherein the digital content complies with at least one of the DVD specifications.

8. A method of authoring digital content comprising the steps of testing a plurality of digital content players using a method as claimed in claim 1; and reauthoring digital content in response to said testing.

9. The method as claimed in claim 1, further comprising providing an indication of the result or results of the determination.

10. A method as claimed in claim 9, further comprising monitoring the results and reauthoring the content in response to the monitoring.

11. The method as claimed in claim 10, wherein monitoring comprises identifying unpredictable navigational behaviour of the player in response to a corresponding aspect of the digital content, and wherein reauthoring the content in response to the monitoring comprises at least editing or deleting the corresponding aspect of the digital content to at least reduce the unpredictable navigational behaviour.

12. The method as claimed in claim 11 further comprising ensuring the reauthored digital content complies with an associated technical standard.

13. The method as claimed in claim 12, wherein at least one of the first digital content and the authored digital content comprises DVD video image data, including both presentation and navigation data.

14. The method as claimed in claim 1, wherein the digital content player is caused to play the digital content by inputting navigational commands thereto.

15. The method of testing as claimed in claim 14 further comprising analyzing data associated with selectable navigation paths of the digital content and selecting the navigational commands in response to said analyzing.

16. The method as claimed in claim 15 wherein determining comprises comparing data associated with the responses of the plurality of players to the control commands with the analysis of the data associated with the selectable navigation paths to determine a degree of correlation between the data associated with the responses and the data associated with the selectable navigation paths.

17. The method as claimed in claim 15 wherein analyzing comprises:
   identifying a plurality of menu choices;
   selecting one menu choice from the plurality of menu choices; and
   selecting the control command according to the selected menu choice.

18. The method as claimed in claim 17 wherein selecting one menu choice comprises:
   determining the respective number of times that the plurality of menu choices have been invoked; and
   selecting the one menu choice according to the respective number of invocations.

19. The method as claimed in claim 15 wherein analyzing data associated with selectable navigation paths comprises identifying the data as being associated with a predeterminable function, the predeterminable function governing an onward navigation path selectable from a plurality of possible onward navigation paths.

20. The method as claimed in claim 19 wherein analyzing data associated with selectable navigation paths comprises generating data associated with each possible onward navigation path; and wherein identifying the onward navigation path comprises discarding the generated data associated with selectable possible onward navigation paths.

21. A computer program product comprising a computer-readable medium having computer readable instructions recorded thereon for testing the navigational response of a digital content player, the computer readable instructions being operative, when performed by a computerized device, to cause the computerized device to:
   play digital content using the digital content player, the digital content being arranged to cause the digital content player to produce an assigned identifiable output;
   ascertain a current playback position with respect to a navigation structure of the content using the assigned identifiable output;
   determine whether the ascertained position corresponds to an anticipated or expected position within the digital content; and
   assess the player using that determination.

22. A system for testing the navigational response a digital content player, the system being arranged to:
   play digital content using the digital content player, the digital content being arranged to cause the digital content player to produce an assigned identifiable output;
   determine a current playback position with respect to a navigation structure of the content using the assigned identifiable output; and
   determine whether the ascertained position corresponds to an anticipated or expected position within the digital content, thereby assessing the player.

23. A method for testing a player for digital content, the method comprising:
   assigning an identifier or identifiers of position with respect to a navigation structure of digital content;
   causing a first player to produce an output associated with said identifier or identifiers by playing said digital content on the first player;
   identifying a position within the navigation structure of the digital content using said output;
   comparing the identified position with a corresponding identified position of a second player playing the same digital content, thereby determining whether the identified position of the first player corresponds to an anticipated or expected position; and
   assessing the first player using that determination.

24. The method as claimed in claim 23, wherein said assessing the first player comprises judging whether the first player is acceptable.

25. The method as claimed in claim 23, in which the second player has been certified as being compliant with a respective technical standard.

26. A computer program product comprising a computer-readable medium having computer readable instructions recorded thereon for testing the navigational response of a digital content player, the computer readable instructions being operative, when performed by a computerized device, to cause the computerized device to:
   assign an identifier or identifiers of position with respect to a navigation structure of digital content;
   cause a first player to produce an output associated with said identifier or identifiers by playing said digital content on the first player;
   identify a position within the navigation structure of the digital content using said output;
   compare the identified position with a corresponding identified position of a second player playing the same digital content, thereby determining whether the identified position of the first player corresponds to an anticipated or expected position; and
   assess the first player using that determination.

27. A system for testing the navigational response of a digital content player, the system being arranged to:
   assign an identifier or identifiers of position with respect to a navigation structure of digital content;
   cause a first player to produce an output associated with said identifier or identifiers by playing said digital content on the first player;
   identify a position within the navigation structure of the digital content using said output;
   compare the identified position with a corresponding identified position of a second player playing the same digital content, thereby determining whether the identified position of the first player corresponds to an anticipated or expected position; and
   assess the first player using that determination.

* * * * *